United States Patent
Hu et al.

(10) Patent No.: US 12,147,769 B2
(45) Date of Patent: Nov. 19, 2024

(54) METHOD FOR ALIGNING TEXT WITH MEDIA MATERIAL, APPARATUS AND STORAGE MEDIUM

(71) Applicants: Baidu.com Times Technology (Beijing) Co., Ltd., Beijing (CN); Baidu USA LLC, Sunnyvale, CA (US)

(72) Inventors: Yichen Hu, Sunnyvale, CA (US); Xi Chen, Sunnyvale, CA (US); Hao Tian, Sunnyvale, CA (US)

(73) Assignees: BAIDU.COM TIMES TECHNOLOGY (BEIJING) CO., LTD., Beijing (CN); BAIDU USA LLC, Sunnyvale, CA (US)

( * ) Notice: Subject to any disclaimer, the term of this patent is extended or adjusted under 35 U.S.C. 154(b) by 451 days.

(21) Appl. No.: 17/538,932

(22) Filed: Nov. 30, 2021

(65) Prior Publication Data

US 2022/0083741 A1    Mar. 17, 2022

(51) Int. Cl.
G06F 40/30      (2020.01)
G06F 16/783    (2019.01)
G06F 40/253    (2020.01)
G11B 27/036    (2006.01)
H04N 21/845    (2011.01)

(52) U.S. Cl.
CPC .......... *G06F 40/30* (2020.01); *G06F 16/7844* (2019.01); *G06F 40/253* (2020.01); *G11B 27/036* (2013.01); *H04N 21/8455* (2013.01)

(58) Field of Classification Search
CPC ....... G06F 40/30; G06F 40/279; G06F 40/253
See application file for complete search history.

(56) References Cited

U.S. PATENT DOCUMENTS

| | | | |
|---|---|---|---|
| 9,286,287 B1 * | 3/2016 | Tierney | G06F 40/242 |
| 2012/0303643 A1 * | 11/2012 | Lau | G06F 40/45 |
| | | | 707/756 |
| 2014/0040713 A1 * | 2/2014 | Dzik | G10L 15/26 |
| | | | 715/203 |
| 2018/0032305 A1 * | 2/2018 | Cameron | G06F 40/30 |
| 2020/0213478 A1 * | 7/2020 | Beckett, III | G06F 40/279 |
| 2020/0372378 A1 * | 11/2020 | Isobe | G06N 5/04 |
| 2022/0248080 A1 * | 8/2022 | Strickland | H04N 21/242 |
| 2022/0284886 A1 * | 9/2022 | Murali | G10L 15/05 |
| 2022/0301579 A1 * | 9/2022 | Cao | G10L 15/26 |
| 2023/0028897 A1 * | 1/2023 | Mukhopadhyay | G06F 40/279 |
| 2023/0107968 A1 * | 4/2023 | Trivedi | H04N 21/4856 |
| | | | 434/157 |

* cited by examiner

*Primary Examiner* — Mark Villena
(74) *Attorney, Agent, or Firm* — Seed IP Law Group LLP (57) ABSTRACT

A method for aligning a text with a media material, an apparatus, and a storage medium are provided. The method includes: determining a set of anchor points in the text; performing following operations i) to v) repeatedly until all anchor points are removed from the set of anchor points or all media materials are removed from a set of media materials: i) ranking the anchor points in the set of anchor points, ii) selecting a target anchor point from the set of anchor points based on the ranked anchor points in the set, iii) determining, from the set of media materials, a media material matching a text segment starting from the target anchor point, iv) removing the target anchor point, and v) removing the media material matching the text segment starting from the target anchor point; and aligning the text segments with respective media matching materials.

18 Claims, 11 Drawing Sheets

METHOD FOR ALIGNING TEXT WITH MEDIA MATERIAL, APPARATUS AND STORAGE MEDIUM

TECHNICAL FIELD

Embodiments of the present disclosure relate generally to the field of computer technology, and more particularly, to a method for aligning a text with a media material, an apparatus, and a computer-readable storage medium.

BACKGROUND

Short video production is a job with a certain threshold, and humans often need a lot of training to master this skill. In the short video production process, it is generally divided into commentary writing, collection of related media materials, matching of media materials and text, and final rendering. With the rise of deep learning algorithms in recent years, commentary writing and the collection of related media materials can be solved by many algorithms.

SUMMARY

In a first aspect, a method for aligning a text with a media material is provided. The method includes: determining a set of anchor points in the text based on a grammatical structure of the text, each of the anchor points being a starting position of a text segment of the text; performing following operations i) to v) repeatedly until all anchor points are removed from the set of anchor points or all media materials are removed from a set of media materials: i) ranking the anchor points in the set of anchor points based on text segments starting from the anchor points, ii) selecting a target anchor point from the set of anchor points based on the ranked anchor points in the set, iii) determining, from the set of media materials, a media material matching a text segment starting from the target anchor point, iv) removing the target anchor point from the set of anchor points, and v) removing, from the set of media materials, the media material matching the text segment starting from the target anchor point; and aligning the text segments with respective media matching materials.

In a second aspect, an apparatus for aligning a text with a media material is provided. The apparatus includes one or more processors; and a storage for storing one or more programs executable by the one or more processors to cause the apparatus to perform operations including: determining a set of anchor points in the text based on a grammatical structure of the text, each of the anchor points being a starting position of a text segment of the text; performing following operations i) to v) repeatedly until all anchor points are removed from the set of anchor points or all media materials are removed from a set of media materials: i) ranking the anchor points in the set of anchor points based on text segments starting from the anchor points, ii) selecting a target anchor point from the set of anchor points based on the ranked anchor points in the set, iii) determining, from the set of media materials, a media material matching a text segment starting from the target anchor point, iv) removing the target anchor point from the set of anchor points, and v) removing, from the set of media materials, the media material matching the text segment starting from the target anchor point; and aligning the text segments with respective media matching materials.

In a third aspect, a non-transitory computer readable storage medium storing instructions is provided, where the instructions is executable by a processor to perform operations including: determining a set of anchor points in the text based on a grammatical structure of the text, each of the anchor points being a starting position of a text segment of the text; performing following operations i) to v) repeatedly until all anchor points are removed from the set of anchor points or all media materials are removed from a set of media materials: i) ranking the anchor points in the set of anchor points based on text segments starting from the anchor points, ii) selecting a target anchor point from the set of anchor points based on the ranked anchor points in the set, iii) determining, from the set of media materials, a media material matching a text segment starting from the target anchor point, iv) removing the target anchor point from the set of anchor points, and v) removing, from the set of media materials, the media material matching the text segment starting from the target anchor point; and aligning the text segments with respective media matching materials.

BRIEF DESCRIPTION OF THE DRAWINGS

The above and other features, advantages and aspects of the embodiments of the present disclosure will become more apparent from the following detailed description in conjunction with the accompanying drawings. In the drawings, the same or similar reference numerals denote the same or similar elements.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

In the related technology, the semantic vector of the picture or video is calculated and is stored in the set of media materials. A semantic vector of an input text is calculated to be compared with the stored semantic vector in the set of media materials, and the matching picture or video is returned. In an alternative way, a keyword of a text is compared with a keyword of a media material to perform the search of the video.

In the related technology, the keywords or feature vectors are not combined. When considering the alignment of a single media material and text, only the characteristics of the current material or text is considered to obtain the local optimal solution, and the global optimal solution from the material library or the entire text level is not considered. Further, the alignment between the material and the text is not precise enough, and there is no guarantee that the starting position of the material can be accurate to a certain word in the text. The video generation efficiency of some approaches is not high.

Figure 1:
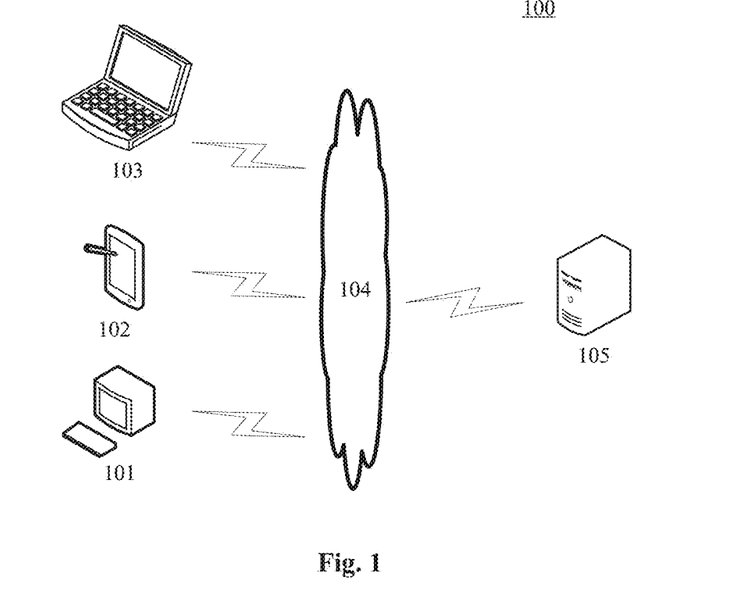
FIG. 1 is an example system architecture 100 in which an embodiment of a method for aligning a text with a media material according to some embodiments of the present disclosure may be applied.

FIG. 1 illustrates an example system architecture 100 in which an embodiment of a method for aligning a text with a media material according to some embodiments of the present disclosure may be applied.

As shown in FIG. 1, the system architecture 100 may include terminal devices 101, 102 and 103, a network 104, and a first server 105. The network 104 serves as a medium providing a communication link between the terminal devices 101, 102 and 103 and the first server 105. The network 104 may include various types of connections, for example, wired or wireless communication links, or optical fiber cables.

A user may use the terminal devices 101, 102 and 103 to interact with the first server 105 via the network 104 to receive or send a message, etc. Various communication client applications (e.g., a video generation application, and a webpage browser application) may be installed on the terminal devices 101, 102 and 103. The terminal devices 101, 102 and 103 may perform corresponding processing in response to an operation of the user on a button of a first interface or a second interface.

The terminal devices 101, 102 and 103 may be hardware or software. When being the hardware, the terminal devices 101, 102 and 103 may be various electronic devices, the electronic devices including, but not limited to, a smartphone, a tablet computer, a laptop portable computer, a desktop computer, etc. When being the software, the terminal devices 101, 102 and 103 may be installed in the above listed electronic devices. The terminal devices may be implemented as a plurality of pieces of software or a plurality of software modules (e.g., software or software modules for providing a distributed service), or as a single piece of software or a single software module, which will not be specifically defined here.

The first server 105 may be a server providing various services, for example, a backend server providing support for aligning a text with a media material. The backend server may receive a request or a web address sent by the terminal devices 101, 102 and 103, perform corresponding processing on the request or the web address, and return the processing result (e.g., a video) to the terminal devices.

It should be noted that the method for aligning a text with a media material provided by some embodiments of the present disclosure is performed by the terminal devices 101, 102 and 103 or the server 105. Correspondingly, the apparatus for aligning a text with a media material is generally provided in the terminal devices 101, 102 and 103 or the server 105.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the networks, and the first servers in FIG. 1 are merely illustrative. Any number of terminal devices, networks, and first servers may be provided based on actual requirements.

Figure 2:
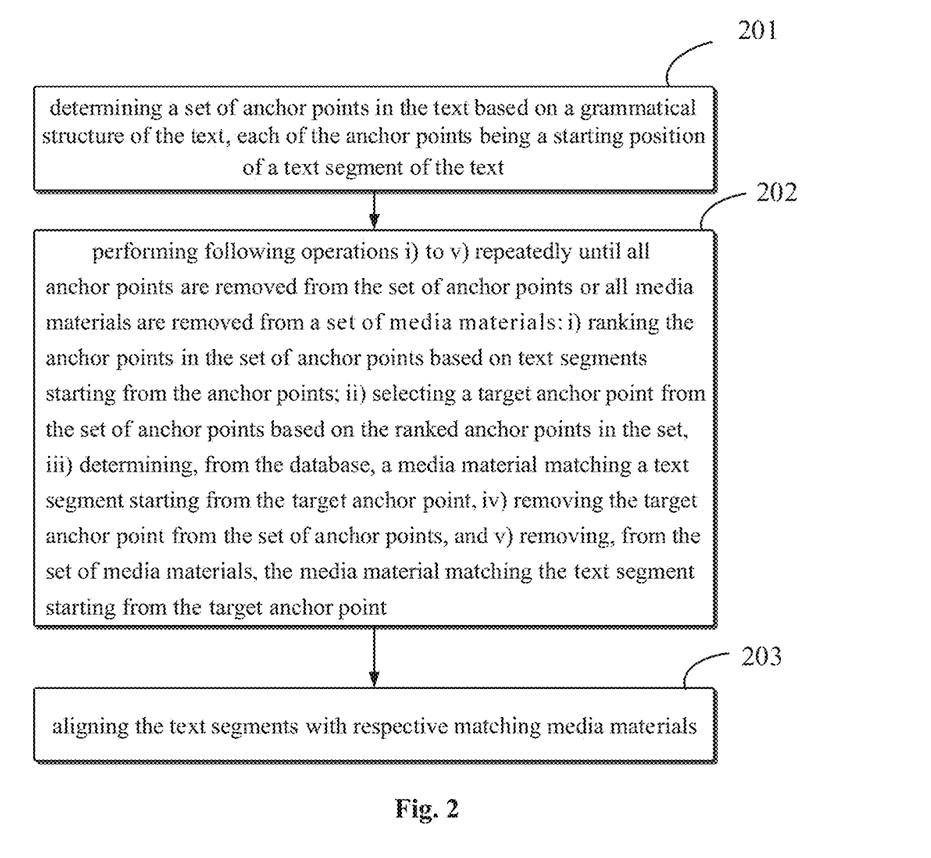
FIG. 2 is a flowchart of a method for aligning a text with a media material according to some embodiments of the disclosure.

FIG. 2 is a flowchart of a method for aligning a text with a media material according to some embodiments of the disclosure. The method includes steps 201 to 203.

Step 201 includes: determining a set of anchor points in the text based on a grammatical structure of the text, each of the anchor points being a starting position of a text segment of the text.

In some embodiments, the text is acquired from a webpage. The webpage includes a picture and the text. In some embodiments, the text is inputted by a user through an interface of a video generation application.

In some embodiments, after acquiring the text, a search is performed on the Internet, on the local computer, or performed online or offline, to acquire a set of media materials matching the text. In some embodiments, the search is performed based on a keyword comparison, semantic processing and so on. In some embodiments, the search is performed based any existing algorithm available to acquire the set of media materials.

In some embodiments, the grammatical structure of the text includes paragraphs, sentences and words of the text. In some embodiments, the text segment of the text is a word or a sentence of the text. In some embodiments, step 201 includes: determining a starting position of a word or a sentence as the anchor point in the set of anchor points.

Step 202 includes: performing following operations i) to v) repeatedly until all anchor points are removed from the set of anchor points or all media materials are removed from the set of media materials: i) ranking the anchor points in the set of anchor points based on text segments starting from the anchor points; ii) selecting a target anchor point from the set of anchor points based on the ranked anchor points in the set, iii) determining, from the set of media materials, a media material matching a text segment starting from the target anchor point, iv) removing the target anchor point from the set of anchor points, and v) removing, from the set of media materials, the media material matching the text segment starting from the target anchor point.

In some embodiments, the media materials include a picture or a video segment.

Figure 3:
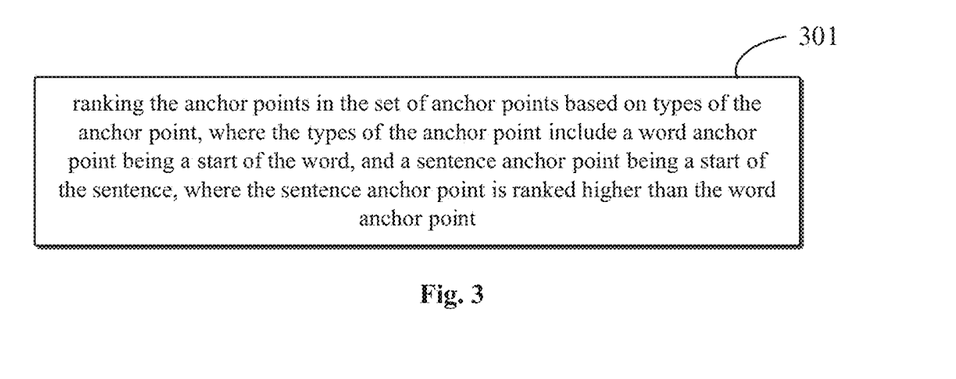
FIG. 3 is a schematic diagram of an implementation of ranking the anchor points in the set of anchor points according to some embodiments of the disclosure.

In some embodiments, operation i) includes step 301. Step 301 includes: ranking the anchor points in the set of anchor points based on types of the anchor point, where the types of the anchor point include a word anchor point being a start of the word, and a sentence anchor point being a start of the sentence. In some embodiments, the sentence anchor point is ranked higher than the word anchor point.

Figure 4:
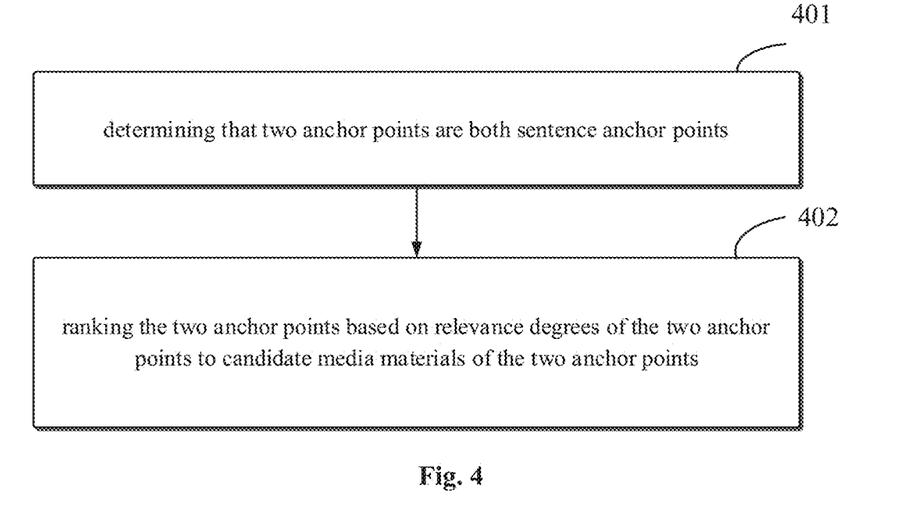
FIG. 4 is a schematic diagram of an implementation of ranking the anchor points in the set of anchor points according to some embodiments of the disclosure.

In some embodiments, step 301 includes steps 401 and 402 as shown in FIG. 4. Step 401 includes determining that two anchor points are both sentence anchor points. Step 402 includes ranking the two anchor points based on relevance degrees of the two anchor points to candidate media materials of the two anchor points.

Figure 5:
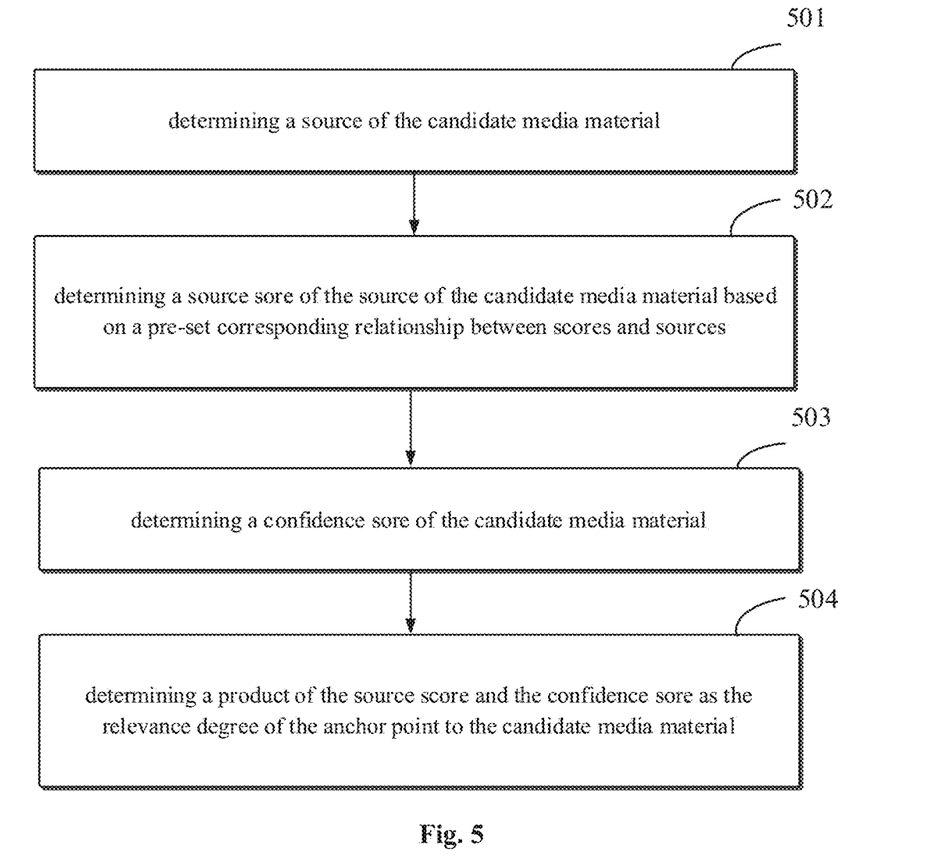
FIG. 5 is a schematic diagram of an implementation of determining a relevance degree of the anchor point to a candidate media material according to some embodiments of the disclosure.

In some embodiments, step 402 includes steps 501 to 504 as shown in FIG. 5. Step 501 includes: determining a source of the candidate media material. Step 502 includes: determining a source sore of the source of the candidate media material based on a pre-set corresponding relationship between scores and sources. Step 503 includes: determining a confidence sore of the candidate media material. Step 504 includes: determining a product of the source score and the confidence sore as the relevance degree of the anchor point to the candidate media material.

In some embodiments, a list of source scores of different sources are pre-stored. In some embodiments, a score of a first source including the text to be aligned and the media material is 1, a score of a second source being online resources is 0.75, and a score of a third source being a local database is 0.25.

It should be noted that the scores of sources may be set as needed.

In some embodiments, the first source is a webpage, and the to-be-aligned text and the media material are acquired from a given webpage. In some embodiments, the confidence score is determined based on a distance of the to-be-aligned text to the media material, the distance being a number of paragraphs between the to-be-aligned text and the media material in the webpage. In some embodiments, the confidence score is determined by a formula: 3/(2+distance).

In some embodiments, the media material includes an object, an image recognition is performed on the media material to recognize the object, and the confidence score is the confidence of the recognition result. In some embodiments, the object is a face, a whole face of a person is recognized from a first media material, only a part of the face of the person is recognized from a second media material, and the first confidence score of the first media material is higher than the second confidence score of the second media material. In some embodiments, the first confidence score is 0.99, and the second confidence score is 0.8.

It should be noted that the confidence scores may be set as needed, or determined by other appropriate approaches for determining the confidence scores of the media material.

Figure 6:
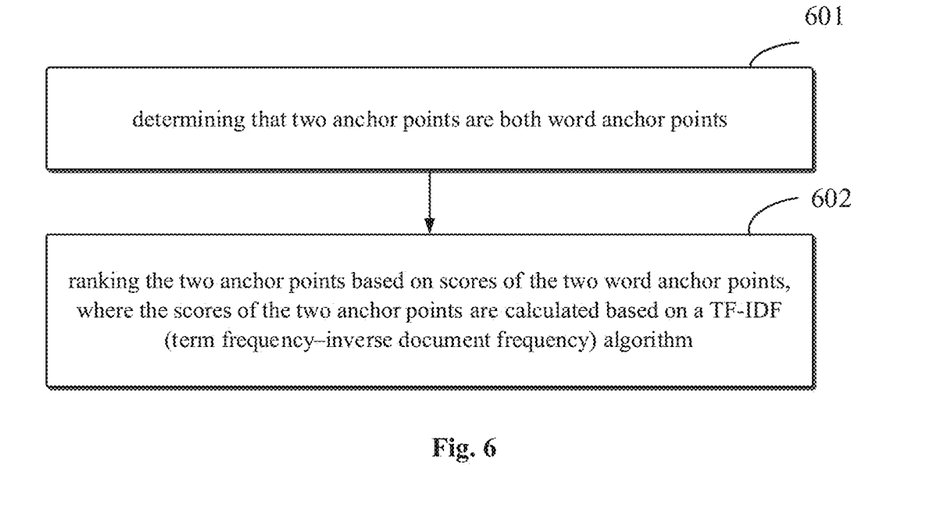
FIG. 6 is a schematic diagram of an implementation of ranking the anchor points in the set of anchor points according to some embodiments of the disclosure.

In some embodiments, step 301 includes steps 601 and 602. Step 601 includes: determining that two anchor points are both word anchor points. Step 602 includes: ranking the two anchor points based on scores of the two word anchor points. In some embodiments, the scores of the two anchor points are calculated based on a TF-IDF (term frequency-inverse document frequency) algorithm.

Figure 7:
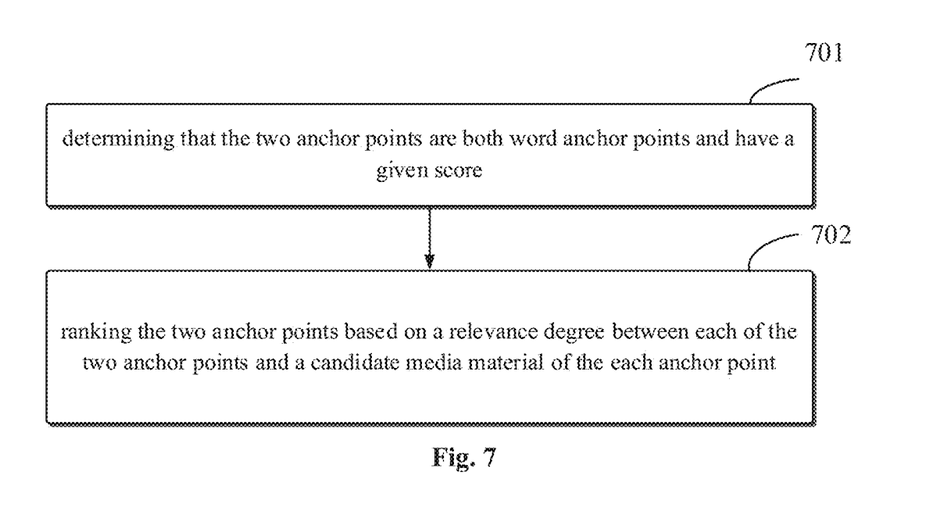
FIG. 7 is a schematic diagram of an implementation of ranking the anchor points in the set of anchor points according to some embodiments of the disclosure.

In some embodiments, step 601 includes step 701. Step 701 includes: determining that the two anchor points are both word anchor points and have a given score. In some embodiments, step 602 includes step 702. Step 702 includes: ranking the two anchor points based on a relevance degree between each of the two anchor points and a candidate media material of the anchor point. The relevance degree may be determined using the approach described above.

Figure 8:
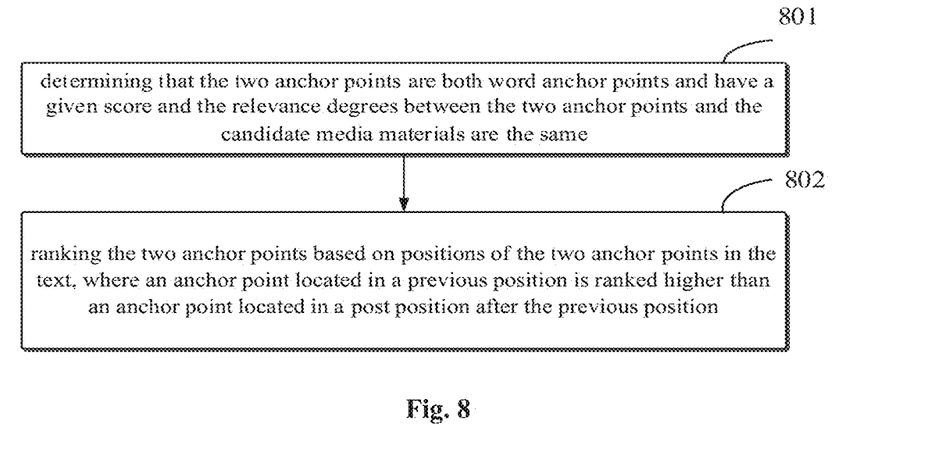
FIG. 8 is a schematic diagram of an implementation of ranking the anchor points in the set of anchor points according to some embodiments of the disclosure.

In some embodiments, step 701 includes step 801, and step 702 includes step 802. Step 801 includes: determining that the two anchor points are both word anchor points and have a given score and the relevance degrees between the two anchor points and the candidate media materials are the same. Step 802 includes: ranking the two anchor points based on positions of the two anchor points in the text. In some embodiments, an anchor point located in a previous position is ranked higher than an anchor point located in a post position after the previous position.

In some embodiments, two identical words start from two different anchor points. For example, in a text "Tom likes playing basketball, and Peter also likes playing basketball", the first word starting from a first anchor point and the second word starting a second anchor point are both "basketball", and have a given score and identical relevance degrees with a media material. In this case, the positions of the first word and the second word are compared to rank the first word and the second word, and the previous "basketball" is ranked higher than the post "basketball".

Figure 9:
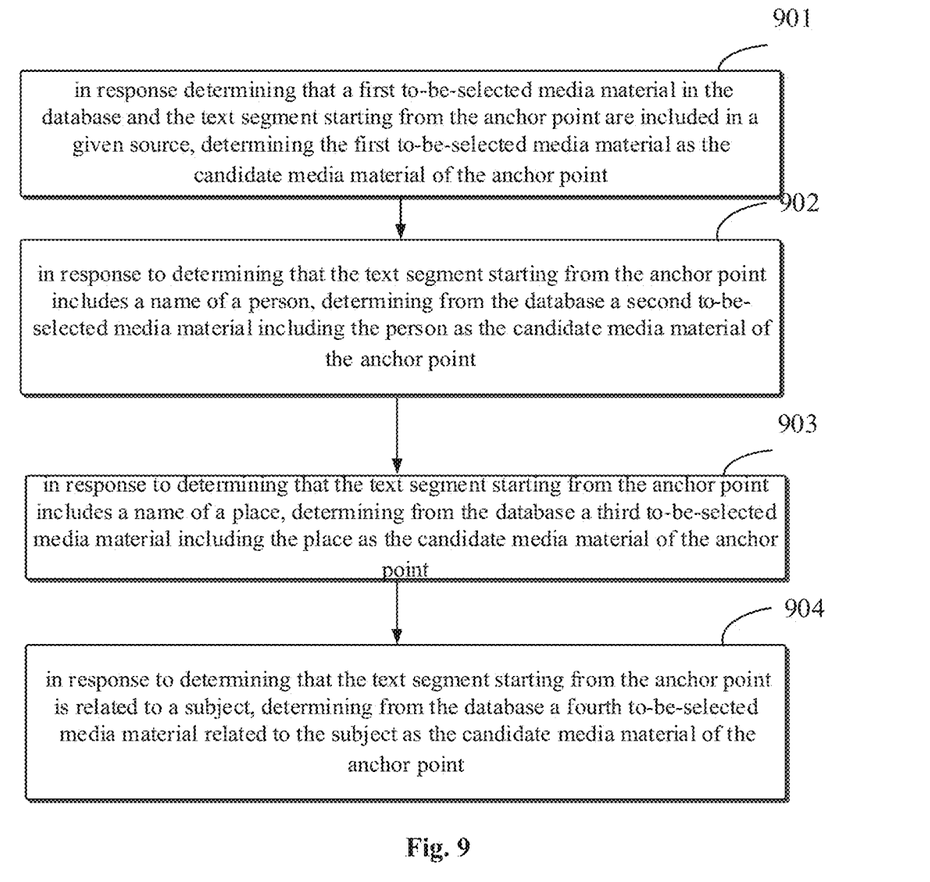
FIG. 9 is a schematic diagram of an implementation of determining the candidate media material for the anchor point according to some embodiments of the disclosure.

In some embodiments, the candidate media materials for the anchor point are determined by steps 901 to 904 as shown in FIG. 9. Step 901 includes: in response determining that a first to-be-selected media material in the set of media materials and the text segment starting from the anchor point are included in a given source, determining the first to-be-selected media material as the candidate media material of the anchor point. Step 902 includes: in response to determining that the text segment starting from the anchor point includes a name of a person, determining from the set of media materials a second to-be-selected media material including the person as the candidate media material of the anchor point. Step 903 includes: in response to determining that the text segment starting from the anchor point includes a name of a place, determining from the set of media materials a third to-be-selected media material including the place as the candidate media material of the anchor point. Step 904 includes: in response to determining that the text segment starting from the anchor point is related to a subject, determining from the set of media materials a fourth to-be-selected media material related to the subject as the candidate media material of the anchor point.

In some embodiments, the subject is finance. Step 904 includes: in response to determining that the text segment starting from the anchor point is a segment of a financial article, determining from the set of media materials a media material of stocking. In some embodiments, the subject is online encyclopedia. In some embodiments, the online encyclopedia is Wikipedia or Baidupedia. Step 904 includes: in response to determining that the text segment starting from the anchor point is included in the online encyclopedia, determining from the set of media materials a media material included in the online encyclopedia.

Figure 10:
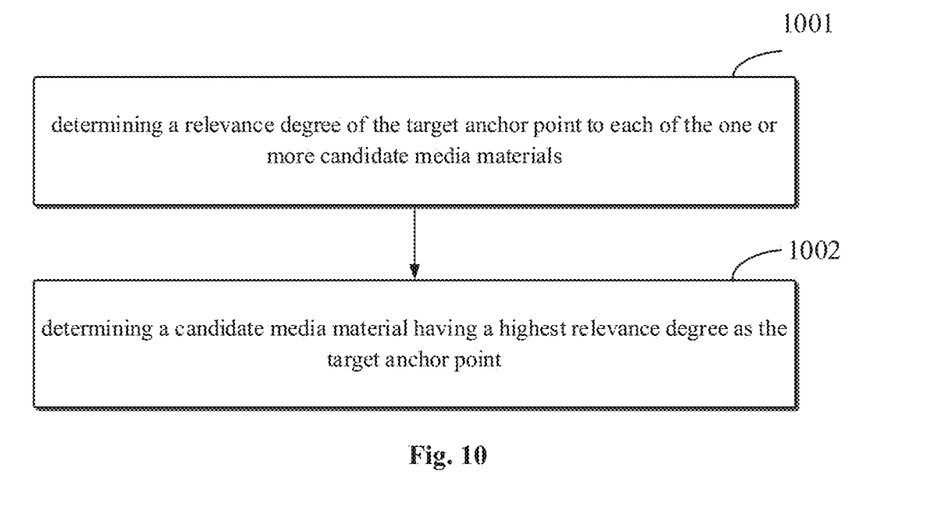
FIG. 10 is a schematic diagram of an implementation of selecting a target anchor point from the set of anchor points according to some embodiments of the disclosure.

In some embodiments, operation ii) includes steps 1001 and 1002. Step 1001 includes: determining a relevance degree of the target anchor point to each of the one or more candidate media materials. Step 1002 includes: determining a candidate media material having a highest relevance degree as the target anchor point. The approaches for determining the relevance degree are described above and not repeated herein.

In some embodiments, operation ii) includes: selecting a top ranked anchor point in the set of anchor points as the target anchor point.

Figure 11:
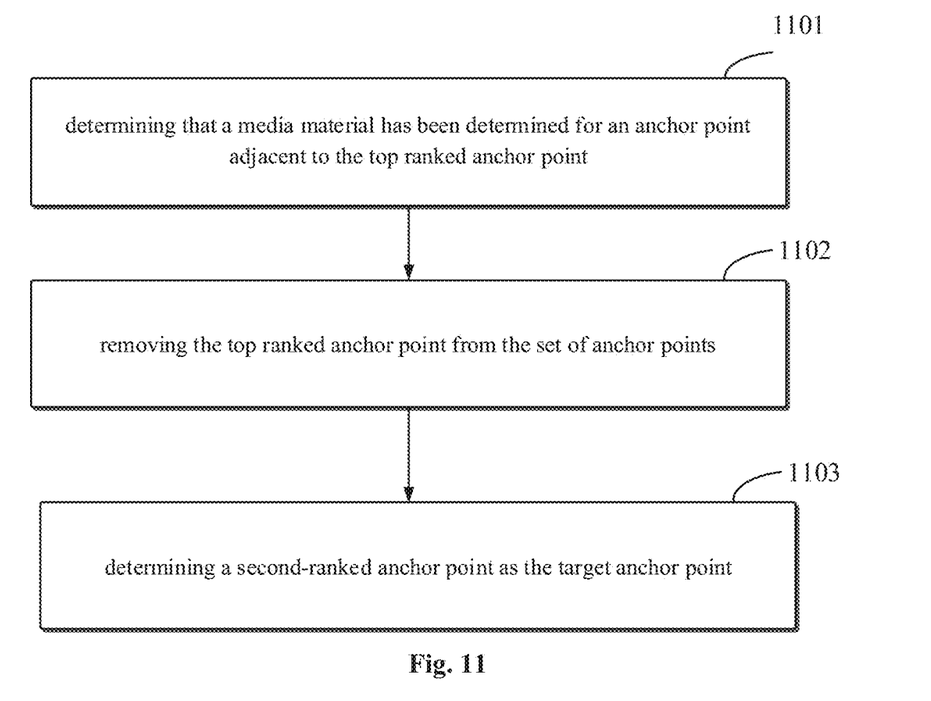
FIG. 11 is a schematic diagram of an implementation of selecting the target anchor point from the set of anchor points according to some embodiments of the disclosure.

In some embodiments, operation ii) includes: steps 1101 to 1103. Step 1101 includes: determining that a matching media material has been determined for an anchor point adjacent to the top ranked anchor point. Step 1102 includes: removing the top ranked anchor point from the set of anchor points. Step 1103 includes: determining a second-ranked anchor point as the target anchor point.

In some embodiments, a media material matching a sentence anchor point is determined and removed from the set of media materials; then a word anchor point adjacent to the sentence anchor point is determined as the top ranked anchor point in the set of media materials; the top ranked word anchor point adjacent to the sentence anchor point is removed from the set of anchor points; and a second-ranked word anchor point is determined as the target anchor point.

Step 203 includes aligning the text segments with respective matching media materials.

In some embodiments, starting times of the text segments are aligned with starting times of matching media materials. In some embodiments, audios corresponding to the text segments are generated, playing times of anchor points in audios of the whole text are determined, and starting times of matching media materials are aligned with the playing times of anchor points in audios of the whole text, After alignment, the audios and the media materials are combined to generate a video.

With the method of aligning a text with a media material, the efficiency of short video production and the automation degree of short video production are improved. In general, the alignment effect of the final short video does not lose to the level of human editing. At the same time, due to the unique anchor selection algorithm, the appeal of the final video to the audience is often higher than that of human editing.

Figure 12:
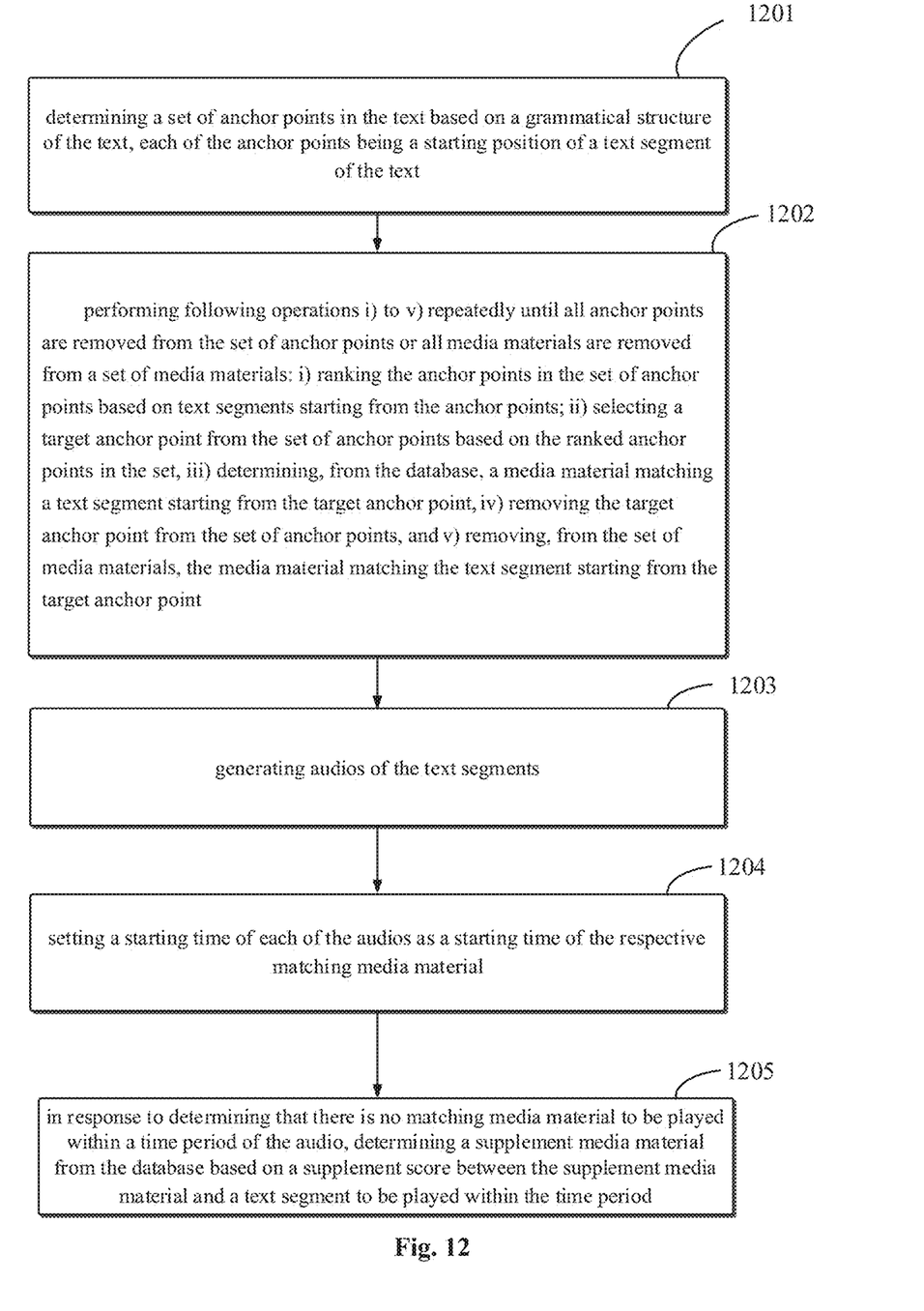
FIG. 12 illustrates a method for aligning a text with a media material according to some other embodiments of the disclosure.

FIG. 12 illustrates a method for aligning a text with a media material according to some other embodiments of the disclosure. The method includes steps 1201 to 1205.

Steps 1201 and 1202 are the same as steps 201 to 202. The description may refer to the description of steps 201 to 202.

Step 1203 includes: generating audios of the text segments.

In some embodiments, audios of the text segments are generated using online voice generation platform. In some embodiments, audios of the text segments are generated using an audio generation application installed in the local computer. In some embodiments, the online voice generation platform is any available online platform.

Figure 13:
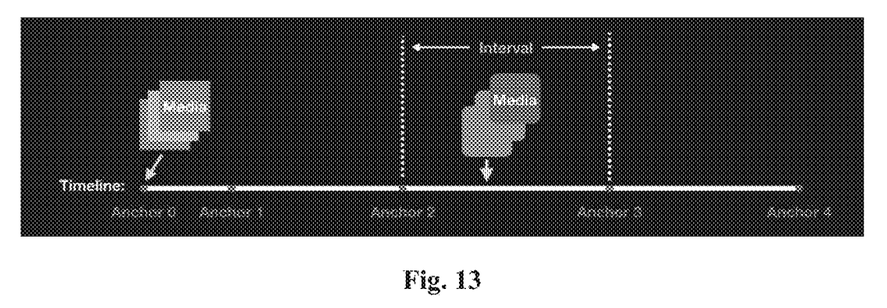
FIG. 13 illustrates a schematic diagram of a timeline of anchor points according to some embodiments of the disclosure.

In some embodiments, audios of the text segments are respectively generated, and each audio has a playing duration. A time line of the anchor points is generated as shown in FIG. 13. In FIG. 13, each anchor point correspond to a start of an audio. In some embodiments, for a second audio of a second text segment, a playing time of a second anchor point being a start of the second text segment is determined by a first playing duration of a first audio before the second anchor point. A duration for playing one word in the second audio is calculated through dividing the second duration by a number of words in the second audio, and then a playing time of a specific word in the second audio is a sum of the first duration and a duration for playing words before the specific word in the second text segment.

Step 1204 includes: setting a starting time of each of the audios as a starting time of the respective matching media material.

In some embodiments, a duration for playing one picture is set, such as four seconds. In some embodiments, an original duration for playing a video segment is kept.

Step 1205 includes: in response to determining that there is no matching media material to be played within a time period of the audio, determining a supplement media material from the set of media materials based on a supplement score between the supplement media material and a text segment to be played within the time period.

In some embodiments, the supplement score is determined by a source of the text segment to be played within the time period, a semantic relevance between the supplement media material and the text segment to be played within the time period, and a quality of the supplement media material. In some embodiments, the semantic relevance between the supplement media material and the text segment to be played within the time period is determined by semantic comparison using an erine (Enhanced Representation through Knowledge Integration) model. In some embodiments, the quality of the supplement media material includes an aspect ratio, resolution and the like. In some embodiments, the supplement score is determined by a weighted sum of ernie_score, source_score, quality_score and penalty_score, such as a formula: 0.4×ernie_score+ 0.45×source_score+0.05×quality_score−penalty_score, where ernie_score is a score determined by the ernie model, the source_score is determined from a pre-set table of scores and sources, the quality_score is determined from a pre-set table of scores and parameters of qualities, and the penalty_score is determined by a preset table of penalty scores and situations. In some embodiments, the situations includes a first situation that a media material and a text segment are included in a given source, but the media material has a long distance to the text segment (i.e., the number of paragraphs is too large, such as 10 or more), a second situation that the score calculated by an ernie model is too low (such as only 10 or 20 percent of an average score), or a third situation that an object recognized in the media material is not included in the text segment. In some embodiments, each maximum score of the ernie_score, source_score, quality_score and penalty_score is set as a given value, such as 1.

It should be noted that the any score or relevance degree herein may be set as needed.

In some cases, black screen occurs during playing the video. To avoid the black screen, in some embodiments, a time interval where the black screen is located, and the playing durations of all pictures in this interval are extended to fill the black screen without moving the position of the media material matching the anchor point. In some embodiments, there is no picture in the interval having the black screen, the black screen is filled by extending the duration for playing the picture in an interval before the interval having the black screen to minimize the influence on the media material. In some embodiments, there is no picture before the interval having the black screen or in the interval having the black screen, the black screen is filled by extending durations for playing all pictures or by playing the video segment for more than one time. In some embodiments, a playing threshold is set. In some embodiments, in response to determining that the black screen is filled or there is no black screen, the media material with a longest playing duration is found, a portion of the longest playing duration exceeding the playing threshold is removed, and durations for playing pictures are extended such that the overall duration for playing all matching medial materials are not changed.

Figure 14:
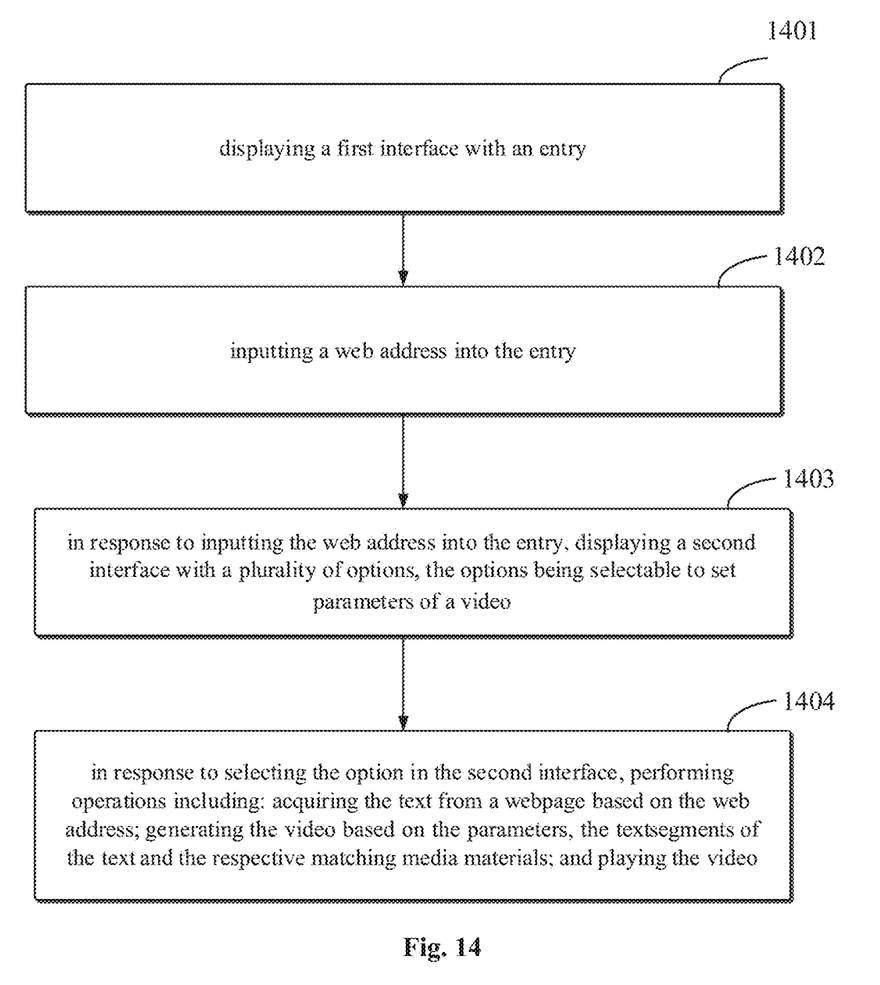
FIG. 14 illustrates a method for controlling an interface to generate a video according to some embodiments of the disclosure.

FIG. 14 illustrates a method for controlling an interface to generate a video.

The method includes steps 1401 to 1404.

Step 1401 includes displaying a first interface with an input box. Step 1402 includes: inputting a web address into the input box.

In some embodiments, the web address is a URL (Uniform Resource Locator).

Figure 15:
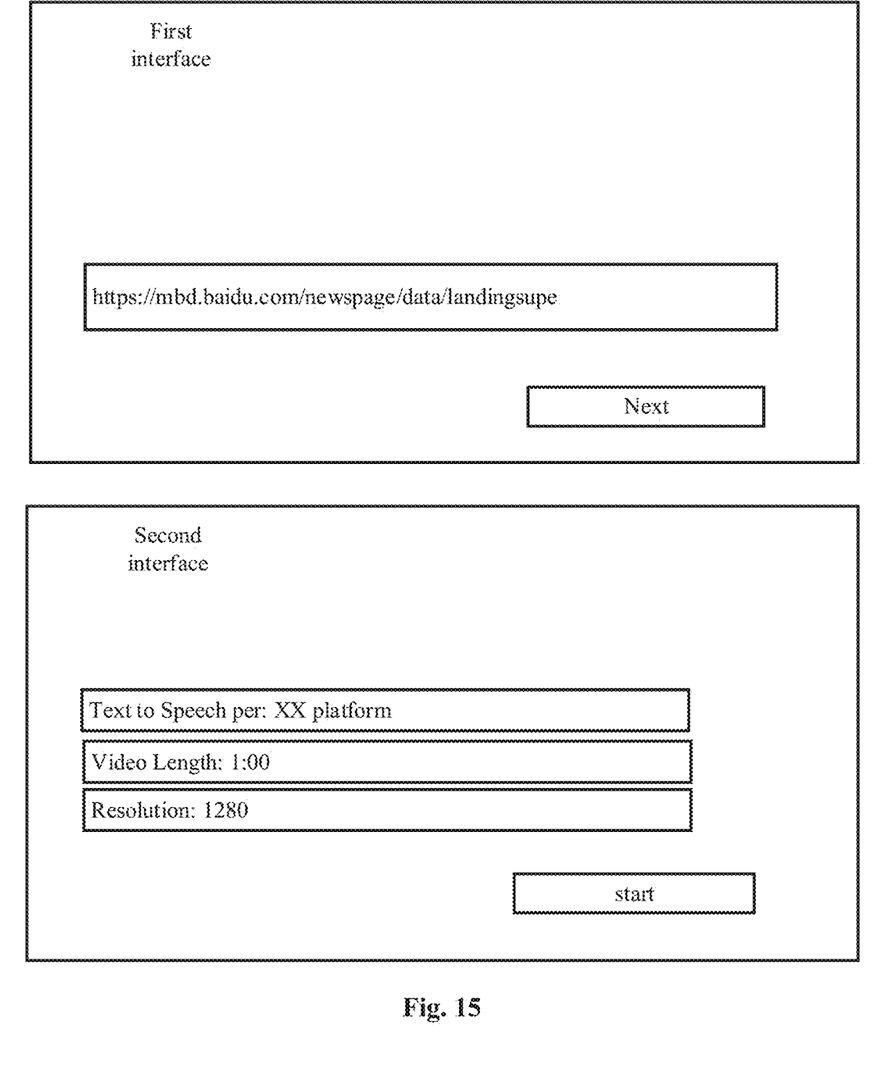
FIG. 15 illustrates an example of a first interface and a second interface according to some embodiments of the disclosure.

Step 1403 includes: in response to inputting the web address into the input box, displaying a second interface with a plurality of options, the options being selectable to set parameters of a video. Step 1404 includes: in response to selecting the option in the second interface, performing operations including: acquiring the text from a webpage based on the web address; generating the video based on the parameters, the text segments of the text and the respective matching media materials; and playing the video on the first interface. FIG. 15 illustrate an example of the first interface and the second interface according to some embodiments of the disclosure. As shown in the first interface, a URL is inputted into the input box, in response to inputting the URL, a second interface with multiple input boxes is displayed. As shown in the second interface, the input boxes are related to text to speech platform, video length and resolution. The values in each input box are selectable, for example, by touching each input box, a menu of options is displayed, and an option is selectable by touching an item in the menu. In some embodiments, by entering the selected parameters, e.g., by touching a start button, a webpage is accessed based on the URL, an article including a text and a medial material in the webpage is acquired, a search is performed based on the text, a set of media materials is acquired by the searching, multiple anchor points are determined and ranked in the text, a matching media material is determined and aligned with each anchor point, and audios of the text are generated and combined with the matching media materials based on the aligned anchor points, to generate the video.

In some embodiments, by entering the URL in the first interface, the video is generated using a default value without entering the second interface. In some embodiments, a third interface is displayed for setting scores of different sources, confidence scores for different kinds of images or videos, or other scores needed to be used in the video generation. With these interfaces, a user is assisted in controlling the computer to generate a video.

Figure 16:
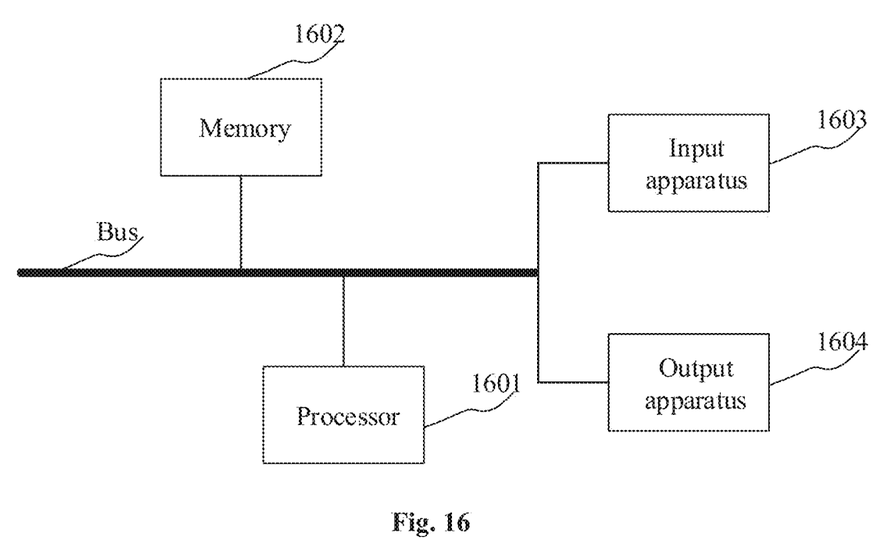
FIG. 16 is a schematic diagram of an apparatus for aligning a text with a media material.

As shown in FIG. 16, the apparatus includes: one or more processors 1601, a memory 1602, and interfaces for connecting various components, including high-speed interfaces and low-speed interfaces. The various components are connected to each other using different buses, and may be mounted on a common motherboard or in other methods as needed. The processor may process instructions executed within the apparatus, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of apparatuses may be connected, and the apparatuses provide some necessary operations, for example, as a server array, a set of blade servers, or a multi-processor system. In FIG. 16, processor 1601 is used as an example.

The memory 1602 is a non-transitory computer readable storage medium provided by the present disclosure. The memory stores instructions executable by at least one processor, so that the at least one processor performs the method for aligning a text with a media material according to some embodiments of disclosure. The non-transitory computer readable storage medium of the present disclosure stores computer instructions for causing a computer to perform the method for aligning a text with a media material according to some embodiments of disclosure.

The memory 1602, as a non-transitory computer readable storage medium, may be used to store non-transitory software programs, non-transitory computer executable programs and modules, such as program instructions/modules corresponding to the method for aligning a text with a media material according to some embodiments of disclosure. The processor 901 executes the non-transitory software programs, instructions, and modules stored in the memory 902 to execute various functional applications and data processing of the server, that is, to implement the method for aligning a text with a media material according to some embodiments of disclosure.

The memory 1602 may include a storage program area and a storage data area, where the storage program area may store an operating system and at least one function required application program; and the storage data area may store data created by the use of the apparatus of the method for aligning a text with a media material according to some embodiments of disclosure. In addition, the memory 902 may include a high-speed random access memory, and may also include a non-transitory memory, such as at least one magnetic disk storage device, a flash memory device, or other non-transitory solid-state storage devices. In some embodiments, the memory 902 may optionally include memories remotely disposed with respect to the processor 901, and these remote memories may be connected to the apparatus of the method for aligning a text with a media material according to some embodiments of disclosure. Examples of the above network include but are not limited to the Internet, intranet, local area network, mobile communication network, and combinations thereof.

The apparatus performing the method for aligning a text with a media material according to some embodiments of disclosure may further include: an input apparatus 1603 and an output apparatus 1604. The processor 1601, the memory 1602, the input apparatus 1603, and the output apparatus 1604 may be connected through a bus or in other methods. In FIG. 16, connection through the bus is used as an example.

The input apparatus 1603 may receive input digital or character information, and generate key signal inputs related to user settings and function control of the apparatus of the method for learning a knowledge representation, such as touch screen, keypad, mouse, trackpad, touchpad, pointing stick, one or more mouse buttons, trackball, joystick and other input apparatuses. The output apparatus 904 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for aligning a text with a media material, the method comprising:
   determining a set of anchor points in the text based on a grammatical structure of the text, each of the anchor points being a starting position of a text segment of the text;
   performing following operations i) to v) repeatedly until all anchor points are removed from the set of anchor points or all media materials are removed from a set of media materials:
   i) ranking the anchor points in the set of anchor points based on text segments starting from the anchor points,
   ii) selecting a target anchor point from the set of anchor points based on the ranked anchor points in the set,
   iii) determining, from the set of media materials, a media material matching a text segment starting from the target anchor point,
   iv) removing the target anchor point from the set of anchor points, and
   v) returning the media material matching the text segment starting from the target anchor point, and removing, from the set of media materials, the media material matching the text segment starting from the target anchor point;
   aligning the text segments with returned matching media materials respectively;
   displaying a first interface with an input box; inputting a web address into the input box;
   and in response to inputting the web address into the input box, displaying a second interface with a plurality of options, the options being selectable to set parameters of a video; and
   in response to determining the option in the second interface, performing operations including: acquiring the text from a webpage based on the web address; generating the video based on the parameters, the text segments of the text and the respective matching media materials; and playing the video.

2. The method according to claim 1, wherein determining the set of anchor points in the text based on the grammatical structure of the text comprises: determining a starting position of a word or a sentence as the anchor point in the set of anchor points.

3. The method according to claim 2, wherein ranking the anchor points in the set of anchor points based on the text segments starting from the anchor points comprises: ranking the anchor points in the set of anchor points based on types of the anchor point, wherein the types of the anchor point comprise a word anchor point being a start of the word, and a sentence anchor point being a start of the sentence, wherein the sentence anchor point is ranked higher than the word anchor point.

4. The method according to claim 3, wherein ranking the anchor points in the set of anchor points based on the text segments starting from the anchor points comprises: determining that two anchor points are both sentence anchor points, and ranking the two anchor points based on relevance degrees of the two anchor points to candidate media materials of the two anchor points.

5. The method according to claim 4, wherein the media materials in the set of media materials are acquired from one or more sources, and each of the relevance degrees of the two anchor points to candidate media materials of the two anchor points is determined by: determining a source of the candidate media material, determining a source sore of the source of the candidate media material based on a pre-set corresponding relationship between scores and sources, determining a confidence sore of the candidate media material, and determining a product of the source score and the confidence sore as the relevance degree of the anchor point to the candidate media material.

6. The method according to claim 3, wherein ranking the anchor points in the set of anchor points based on the text segments starting from the anchor points further comprises: determining that two anchor points are both word anchor points, and ranking the two anchor points based on scores of the two word anchor points, wherein the scores of the two anchor points are calculated based on a TF-IDF (term frequency-inverse document frequency) algorithm.

7. The method according to claim 6, wherein ranking the anchor points in the set of anchor points based on text segments starting from the anchor points further comprises: determining that the two anchor points are both word anchor points and have a given score, and ranking the two anchor points based on a relevance degree between each of the two anchor points and a candidate media material of the each anchor point.

8. The method according to claim 7, wherein ranking the anchor points in the set of anchor points based on the text segments starting from the anchor points further comprises: determining that the two anchor points are both word anchor points and have a given score and the relevance degrees between the two anchor points and the candidate media materials are the same, and ranking the two anchor points based on positions of the two anchor points in the text, wherein an anchor point located in a previous position is ranked higher than an anchor point located in a post position after the previous position.

9. The method according to claim 7, wherein the media materials in the set of media materials are acquired from one or more sources and the candidate media material of the anchor point is determined by:
   in response determining that a first to-be-selected media material in the set of media materials and the text segment starting from the anchor point are included in a given source, determining the first to-be-selected media material as the candidate media material of the anchor point;
   in response to determining that the text segment starting from the anchor point includes a name of a person, determining from the set of media materials a second to-be-selected media material including the person as the candidate media material of the anchor point;

in response to determining that the text segment starting from the anchor point includes a name of a place, determining from the set of media materials a third to-be-selected media material including the place as the candidate media material of the anchor point; and in response to determining that the text segment starting from the anchor point is related to a subject, determining from the set of media materials a fourth to-be-selected media material related to the subject as the candidate media material of the anchor point.

10. The method according to claim 1, wherein the media materials in the set of media materials are acquired from one or more sources, and determining, from the set of media materials, the media material matching the text segment starting from the target anchor point comprises:

determining one or more candidate media materials of the text segment starting from the target anchor point, and determining, from the one or more candidate media materials, the media material matching the text segment starting from the target anchor point, wherein the candidate media material of the target anchor point is determined by:

in response determining that a first to-be-selected media material in the set of media materials and the text segment starting from the target anchor point are included in a given source, determining the first to-be-selected media material as the candidate media material of the target anchor point;

in response to determining that the text segment starting from the target anchor point includes a name of a person, determining from the set of media materials a second to-be-selected media material including the person as the candidate media material of the target anchor point;

in response to determining that the text segment starting from the target anchor point includes a name of a place, determining from the set of media materials a third to-be-selected media material including the place as the candidate media material of the target anchor point; and in response to determining that the text segment starting from the target anchor point is related to a subject, determining from the set of media materials a fourth to-be-selected media material related to the subject as the candidate media material of the target anchor point.

11. The method according to claim 10, wherein determining, from the one or more candidate media materials, the media material matching the text segment starting from the target anchor point: determining a relevance degree of the target anchor point to each of the one or more candidate media materials; and determining a candidate media material having a highest relevance degree as the target anchor point.

12. The method according to claim 10, wherein determining the relevance degree of the target anchor point to each of the one or more candidate media materials comprises: determining the relevance degree of the target anchor point to each of the one or more candidate media materials based on a source of the each candidate media material and a confidence of the each candidate media material.

13. The method according to claim 1, wherein selecting the target anchor point from the set of anchor points based on the ranked anchor points in the set comprises selecting a top ranked anchor point in the set of anchor points as the target anchor point.

14. The method according to claim 1, wherein selecting the target anchor point from the set of anchor points based on the ranked anchor points in the set comprises: determining that a media material has been determined for an anchor point adjacent to the top ranked anchor point, removing the top ranked anchor point from the set of anchor points, and determining a second-ranked anchor point as the target anchor point.

15. The method according to claim 1, wherein aligning the text segments with returned matching media materials respectively comprises: generating audios of the text segments, and aligning the audios with respective matching media materials, and the method further comprises generating a video based on the audios and the respective matching media materials.

16. The method according to claim 15, wherein aligning the audios with returned matching media materials respectively comprises: setting a starting time of each of the audios as a starting time of the respective matching media material, and in response to determining that there is no matching media material to be played within a time period of the audio, determining a supplement media material from the set of media materials based on a supplement score between the supplement media material and a text segment to be played within the time period, wherein the supplement score is determined by a source of the text segment to be played within the time period, a semantic relevance between the supplement media material and the text segment to be played within the time period, and a quality of the supplement media material.

17. An apparatus, comprising:

a processor; and a memory storing instructions, which when executed by the processor, cause the processor to perform operations, the operations including:

determining a set of anchor points in the text based on a grammatical structure of the text, each of the anchor points being a starting position of a text segment of the text;

performing following operations i) to v) repeatedly until all anchor points are removed from the set of anchor points or all media materials are removed from a set of media materials:

i) ranking the anchor points in the set of anchor points based on text segments starting from the anchor points;

ii) selecting a target anchor point from the set of anchor points based on the ranked anchor points in the set, iii) determining, from the set of media materials, a media material matching a text segment starting from the target anchor point, and returning the media material matching the text segment starting from the target anchor point, iv) removing the target anchor point from the set of anchor points, and v) removing, from the set of media materials, the media material matching the text segment starting from the target anchor point;

aligning the text segments with returned matching media materials respectively;

displaying a first interface with an input box; inputting a web address into the input box; and in response to inputting the web address into the input box, displaying a second interface with a plurality of options, the options being selectable to set parameters of a video; and in response to determining the option in the second interface, performing operations including: acquiring the text from a webpage based on the web address; generating the video based on the parameters, the text segments of the text and the respective matching media materials; and playing the vide.

18. A non-transitory machine-readable medium having instructions stored therein, which when executed by a processor, cause the processor to perform operations, the operations comprising:

determining a set of anchor points in the text based on a grammatical structure of the text, each of the anchor points being a starting position of a text segment of the text;

performing following operations i) to v) repeatedly until all anchor points are removed from the set of anchor points or all media materials are removed from a set of media materials:
 i) ranking the anchor points in the set of anchor points based on text segments starting from the anchor points;
 ii) selecting a target anchor point from the set of anchor points based on the ranked anchor points in the set,
 iii) determining, from the set of media materials, a media material matching a text segment starting from the target anchor point,
 iv) removing the target anchor point from the set of anchor points, and
 v) removing, from the set of media materials, the media material matching the text segment starting from the target anchor point;

aligning the text segments with returned matching media materials respectively;

displaying a first interface with an input box; inputting a web address into the input box; and in response to inputting the web address into the input box, displaying a second interface with a plurality of options, the options being selectable to set parameters of a video; and in response to determining the option in the second interface, performing operations including: acquiring the text from a webpage based on the web address; generating the video based on the parameters, the text segments of the text and the respective matching media materials; and playing the vide.

* * * * *